Patented Sept. 29, 1931

1,825,636

UNITED STATES PATENT OFFICE

LEONHARD PINK, OF BERLIN, GERMANY, ASSIGNOR TO HERMANN MEFFERT, OF HAMBURG, GERMANY

REACTION PRODUCT OF SALICYLIC ACID AND HEXAMETHYLENETETRAMINE AND METHOD OF PRODUCING SAME

No Drawing. Application filed March 8, 1929, Serial No. 345,580, and in Germany December 29, 1926.

My invention refers to a new compound formed by combining salicylic acid or one of its homologues with hexamethylenetetramine, and to the process of making same.

I have found that if salicylic acid is dissolved in ethyl alcohol and the solution is heated with hexamethylenetetramine, a salt-like chemical compound is formed, in which hexamethylenetetramine acts as a base. The probable constitution of this compound is

while some of this compound is formed also at ordinary temperature, the reaction is completed only at elevated temperature, preferably near the boiling point of ethyl alcohol (about 78° C.). On removing the solvent by distillation or evaporation in the water bath a stable, viscous syrup of yellow colour is obtained which differs from each of the two components (salicylic acid and hexamethylenetetramine) by its chemical character. On adding ferric chloride, instead of the reaction resulting with salicylic acid, in which a violet solution is obtained, a reddish precipitate is formed. The characteristic reaction of hexamethylenetetramine, which when slightly heated with dilute acids, is converted into the corresponding aldehyde, is obtained in the case of the new product only after vigorous protracted boiling. If the new compound is re-dissolved in alcohol and the solution diluted with an equal quantity of distilled water, the solution remains limpid and no crystalline precipitate of salicylic acid is obtained. Only after adding greater quantities of water a yellow crystalline salt will separate out.

In order to produce the new compound, salicylic acid is dissolved in alcohol and the molecular quantity of hexamethylenetetramine is added, the whole being heated to about 70–75° C. The alcohol is removed by distillation or evaporation and the syrup is dissolved in alcohol at the ratio of about 75 parts by weight syrup to 1000 parts alcohol.

The new compound has the property of dissolving uric acid in the blood and is used in the first line as an embrocation against rheumatism.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. As a new product, the compound obtained by causing salicylic acid in alcoholic solution to react with the molecular quantity of hexamethylenetetramine at a temperature near the boiling point of the alcoholic solvent and removing this solvent, the compound forming a viscous syrup, reacting with ferric chloride with formation of a reddish precipitate and having the property of dissolving uric acid in the blood.

2. As a new product, the compound resulting in heating an alcoholic solution of salicylic acid with the molecular quantity of hexamethylenetetramine to about 70–75° C., removing the alcohol by evaporation and recovering the viscous syrup which remains over, this syrup when treated with ferric chloride, forming a reddish precipitate and having the property of dissolving uric acid in the blood.

3. The method of producing a new compound comprising causing salicylic acid in alcoholic solution to react with the molecular quantity of hexamethylenetetramine at a temperature of about 70–75° C. and removing the solvent.

In testimony whereof I affix my signature.

LEONHARD PINK.